US012598043B2

(12) United States Patent (10) Patent No.: US 12,598,043 B2
Agarwal et al. (45) Date of Patent: Apr. 7, 2026

(54) UPLINK SYMBOLS FOR DEMODULATION REFERENCE SIGNAL ON OPEN RADIO ACCESS NETWORK

(71) Applicant: QUALCOMM Incorporated, San Diego, CA (US)

(72) Inventors: Deepak Agarwal, San Diego, CA (US); Michael Francis Garyantes, Bradley Beach, NJ (US); Abhishek Saurabh Sachidanand Sinha, San Diego, CA (US); James Krysl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 18/474,184

(22) Filed: Sep. 25, 2023

(65) Prior Publication Data

US 2025/0105970 A1 Mar. 27, 2025

(51) Int. Cl.
H04L 5/00 (2006.01)
H04B 7/06 (2006.01)
(Continued)

(52) U.S. Cl.
CPC ......... *H04L 5/0051* (2013.01); *H04B 7/0615* (2013.01); *H04W 56/0045* (2013.01); *H04W 72/0446* (2013.01)

(58) Field of Classification Search
CPC . H04L 5/0051; H04L 25/0224; H04B 7/0615; H04B 7/0456; H04B 7/06952; H04W 56/0045; H04W 72/0446
See application file for complete search history.

(56) References Cited

U.S. PATENT DOCUMENTS

2008/0107014 A1* 5/2008 Huang .................. H04W 28/16
370/336
2024/0348398 A1* 10/2024 Yang ..................... H04L 5/0051
2025/0031067 A1* 1/2025 Demir ................. H04L 25/0228

FOREIGN PATENT DOCUMENTS

WO WO-2023146449 A1 8/2023

OTHER PUBLICATIONS

ETSI TS 103 859: "Publicly Available Specification (PAS), O-RAN Fronthaul Control, User and Synchronization Plane Specification v07.02, (O-RAN-WG4.CUS.0-v07.02)", Draft DTS/MSG-001140 v0.0.2, 650, Route Des Lucioles, F-06921, Sophia-Antipolis Cedex, France, vol. TC MSG Mobile Standards Group, No. V0.0.2, Jul. 6, 2022, pp. 1-309, XP014436418, pp. 25,29,30, p. 42, pp. 41,171.
(Continued)

*Primary Examiner* — Chae S Lee
(74) *Attorney, Agent, or Firm* — Holland & Hart LLP

(57) ABSTRACT

Methods, systems, and devices for wireless communications are described. A remote unit (RU) may transmit, to a distributed unit (DU), an indication of a skew time parameter associated with providing compensated samples for a plurality of symbols associated with a slot. The RU may store a set of samples associated with a first subset of the plurality of symbols associated with the slot, the storing based on a processing delay associated with receiving demodulation reference signals during a portion of the first subset of the plurality of symbols associated with the slot. The RU may transmit, to the DU, a burst of compensated samples for the plurality of symbols in a transmission window that is offset in time from a beginning symbol of the slot according to the skew time parameter.

30 Claims, 14 Drawing Sheets

(51) Int. Cl.
    *H04W 56/00*           (2009.01)
    *H04W 72/0446*       (2023.01)

(56)                    References Cited

OTHER PUBLICATIONS

International Search Report and Written Opinion—PCT/US2024/
048219—ISA/EPO—Dec. 23, 2024.

* cited by examiner

130

105

115

Network
Entity

Transceiver

910

Antenna

915

Communications
Manager

920

Memory

Code

930

925

940

Processor

935

905

900

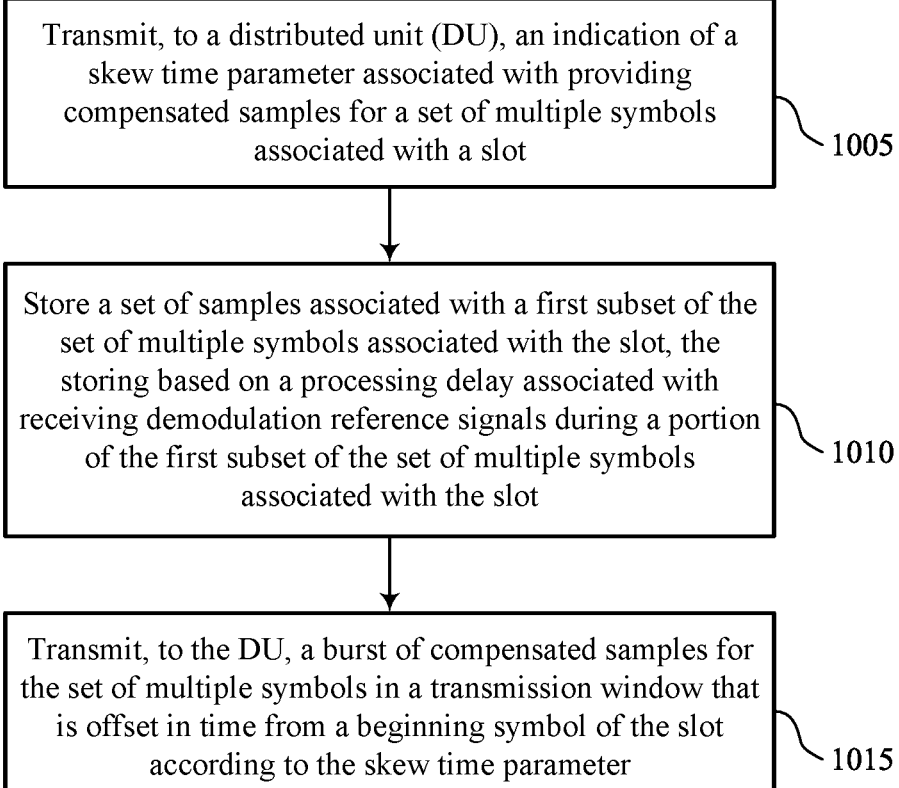

Transmit, to a distributed unit (DU), an indication of a skew time parameter associated with providing compensated samples for a set of multiple symbols associated with a slot

1005

Store a set of samples associated with a first subset of the set of multiple symbols associated with the slot, the storing based on a processing delay associated with receiving demodulation reference signals during a portion of the first subset of the set of multiple symbols associated with the slot

1010

Transmit, to the DU, a burst of compensated samples for the set of multiple symbols in a transmission window that is offset in time from a beginning symbol of the slot according to the skew time parameter

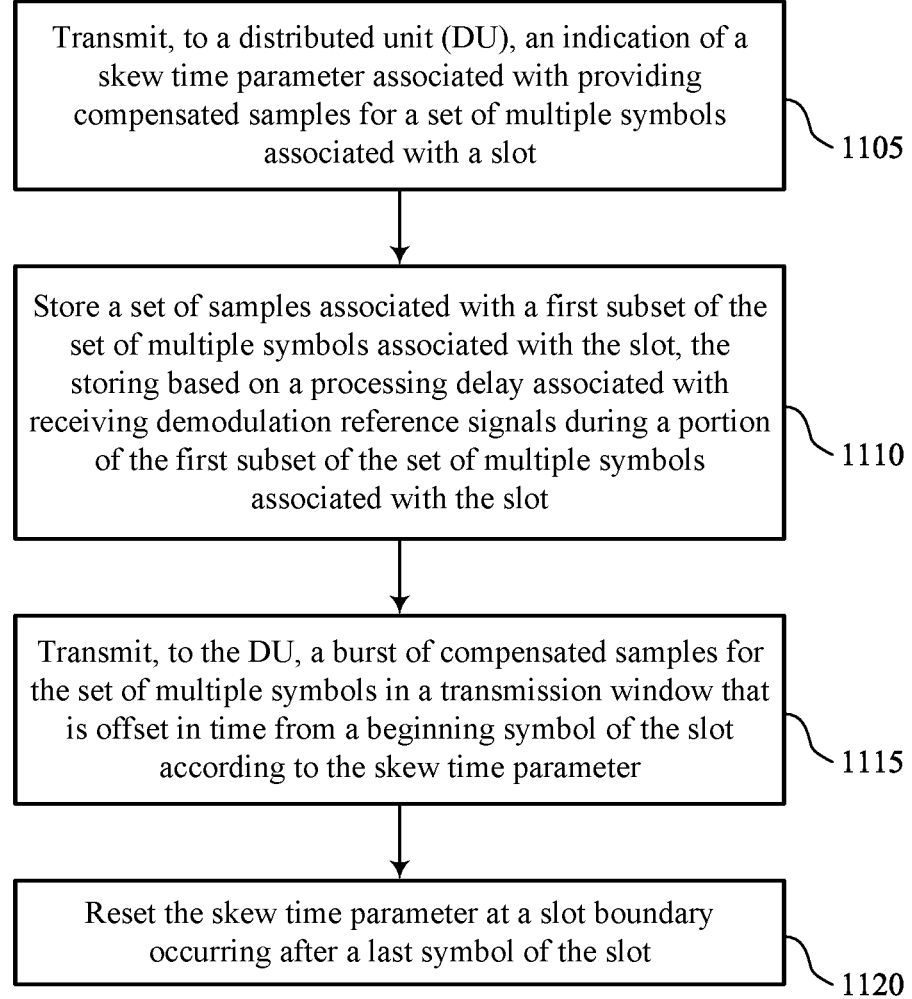

Transmit, to a distributed unit (DU), an indication of a skew time parameter associated with providing compensated samples for a set of multiple symbols associated with a slot ⟩ 1105

Store a set of samples associated with a first subset of the set of multiple symbols associated with the slot, the storing based on a processing delay associated with receiving demodulation reference signals during a portion of the first subset of the set of multiple symbols associated with the slot ⟩ 1110

Transmit, to the DU, a burst of compensated samples for the set of multiple symbols in a transmission window that is offset in time from a beginning symbol of the slot according to the skew time parameter ⟩ 1115

Reset the skew time parameter at a slot boundary occurring after a last symbol of the slot ⟩ 1120

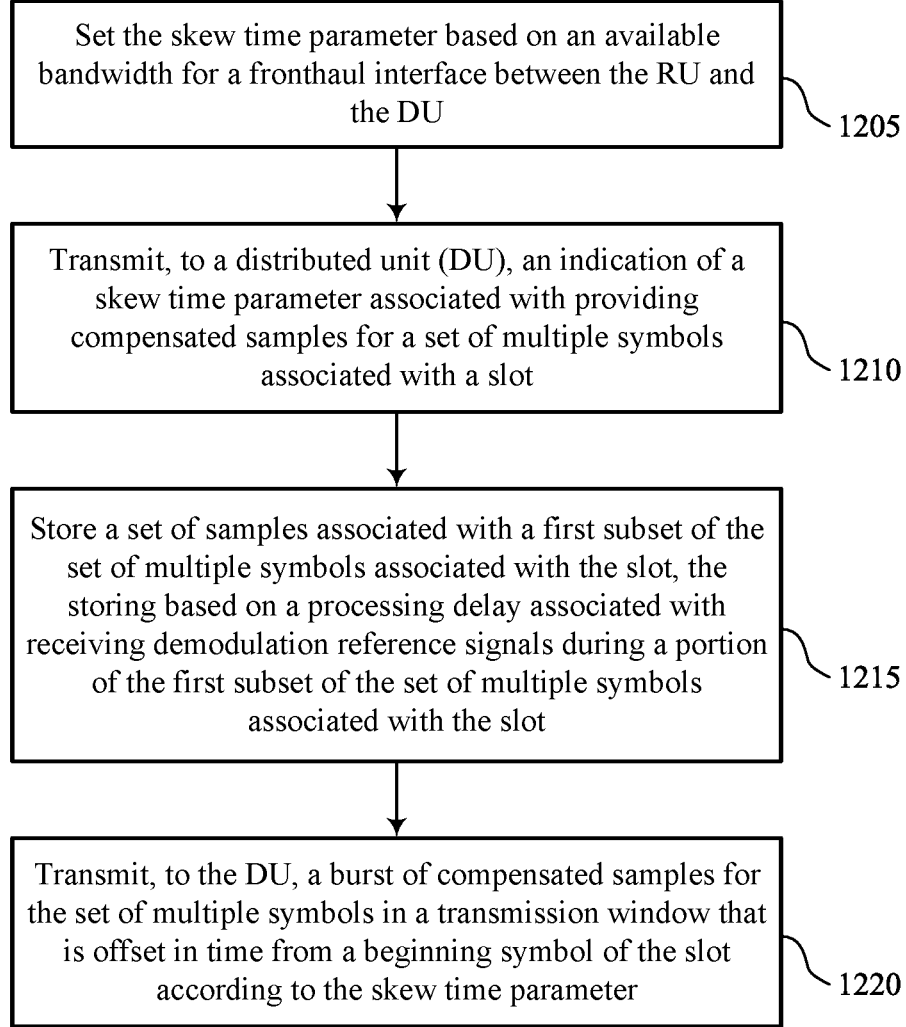

Set the skew time parameter based on an available bandwidth for a fronthaul interface between the RU and the DU

1205

Transmit, to a distributed unit (DU), an indication of a skew time parameter associated with providing compensated samples for a set of multiple symbols associated with a slot

1210

Store a set of samples associated with a first subset of the set of multiple symbols associated with the slot, the storing based on a processing delay associated with receiving demodulation reference signals during a portion of the first subset of the set of multiple symbols associated with the slot

1215

Transmit, to the DU, a burst of compensated samples for the set of multiple symbols in a transmission window that is offset in time from a beginning symbol of the slot according to the skew time parameter

Figure 13:
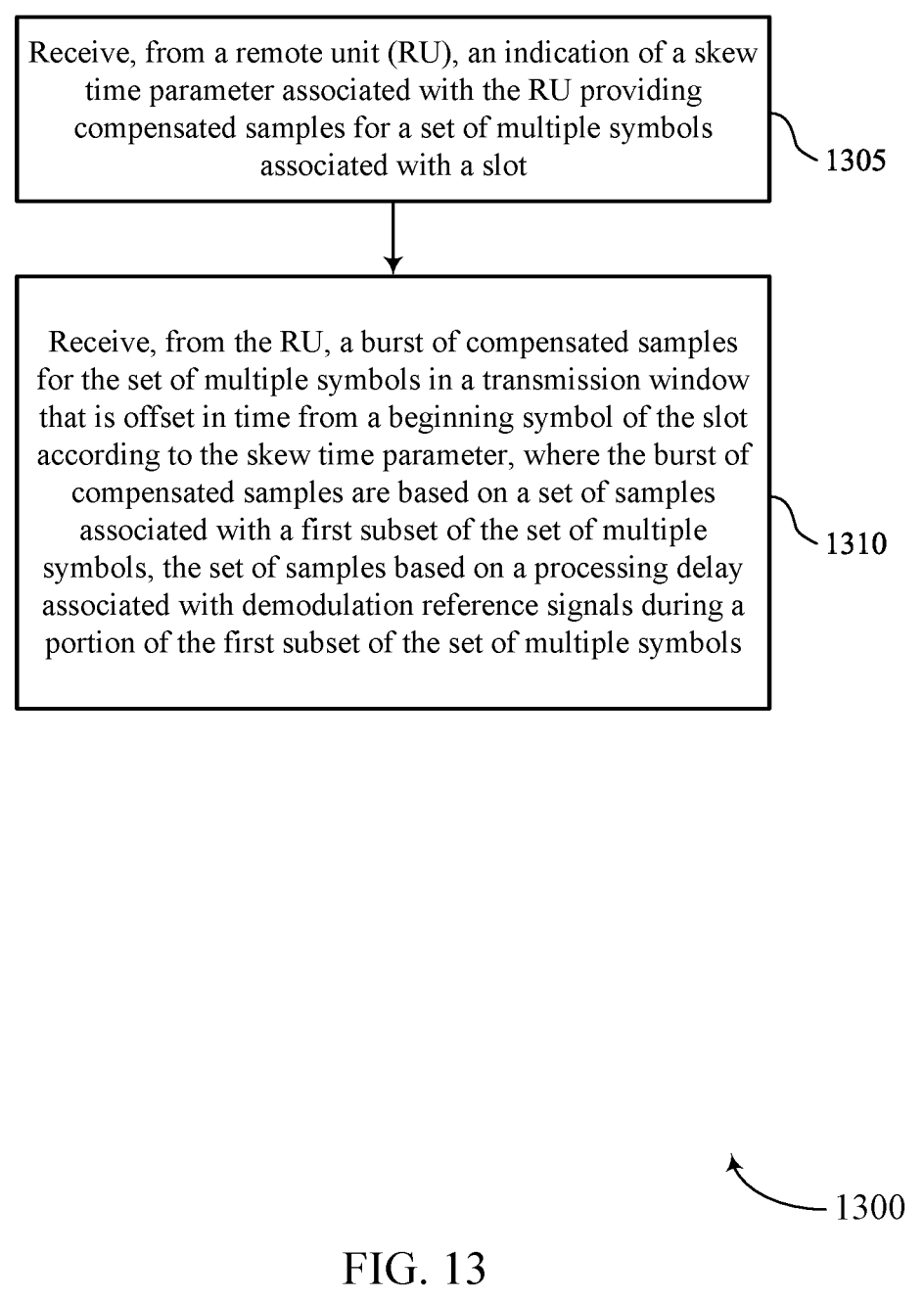

Receive, from a remote unit (RU), an indication of a skew time parameter associated with the RU providing compensated samples for a set of multiple symbols associated with a slot

1305

Receive, from the RU, a burst of compensated samples for the set of multiple symbols in a transmission window that is offset in time from a beginning symbol of the slot according to the skew time parameter, where the burst of compensated samples are based on a set of samples associated with a first subset of the set of multiple symbols, the set of samples based on a processing delay associated with demodulation reference signals during a portion of the first subset of the set of multiple symbols

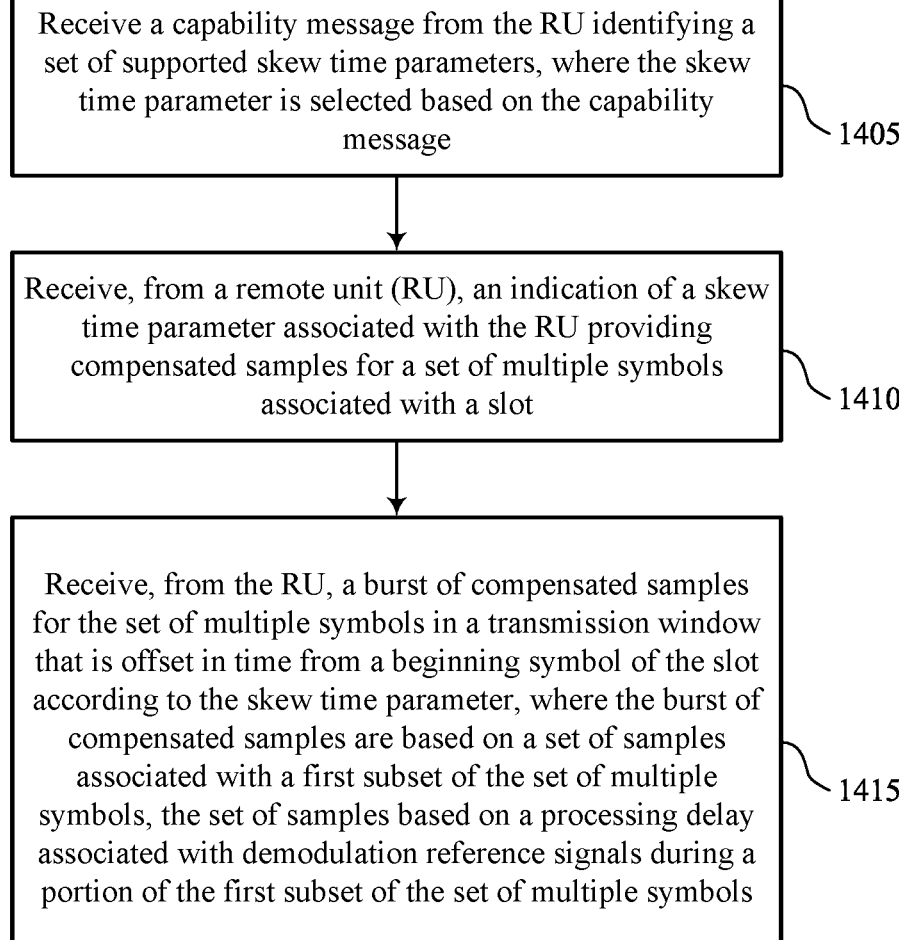

Receive a capability message from the RU identifying a set of supported skew time parameters, where the skew time parameter is selected based on the capability message

1405

Receive, from a remote unit (RU), an indication of a skew time parameter associated with the RU providing compensated samples for a set of multiple symbols associated with a slot

1410

Receive, from the RU, a burst of compensated samples for the set of multiple symbols in a transmission window that is offset in time from a beginning symbol of the slot according to the skew time parameter, where the burst of compensated samples are based on a set of samples associated with a first subset of the set of multiple symbols, the set of samples based on a processing delay associated with demodulation reference signals during a portion of the first subset of the set of multiple symbols

UPLINK SYMBOLS FOR DEMODULATION REFERENCE SIGNAL ON OPEN RADIO ACCESS NETWORK

FIELD OF TECHNOLOGY

The following relates to wireless communications, including uplink symbols for demodulation reference signal on open radio access network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support uplink symbols for demodulation reference signal (DMRS) on open radio access network (O-RAN). For example, the described techniques provide for a skew time parameter (e.g., $T_{skew}$, or more simply "T") value to be configured for burst transmissions of samples obtained by a remote unit (RU). For example, the RU may transmit an indication of a skew time parameter associated with the RU providing compensated samples for symbols of the slot. There may be a delay for communications within the slot (e.g., an interference rejection combining (IRC) delay) based on the RU storing samples for a subset of symbols of the slot. The RU may monitor DMRS transmissions during some symbols of the slot to identify beam weight parameters to be applied to the stored samples. The RU may apply the beam weight parameters to the samples to compensate for channel performance and send the compensated samples to a distributed unit (DU) in a burst transmission. The transmission timing window of the burst transmission may be skewed (e.g., advanced) according to the skew time parameter to mitigate latency delays associated with the RU performing physical layer processing of the samples. That is, the network may define a transmit window for the compensated sample reporting using (min, max) time value pairs with respect to the over-the-air (OTA) time. The IRC delay may move this transmit window to min+IRC Delay, max+IRC delay.

BRIEF DESCRIPTION OF THE DRAWINGS

FIGS. 10 through 14 show flowcharts illustrating methods that support uplink symbols for DMRS on O-RAN in accordance with one or more aspects of the present disclosure.

DETAILED DESCRIPTION

Wireless networks may utilize a central unit/remote unit (CU/DU) split radio access network (RAN) architecture to support wireless communications over a wireless medium. The DU feature may be further split into a DU/remote unit (RU) architecture where the RU manages aspects of physical layer wireless communications. The RU and DU may exchange messages over a fronthaul interface, with each node implementing different functions of the RAN stack. This architecture may introduce delays into the process of compensating stored samples of uplink communications for demodulation and decoding.

The described techniques provide for a skew time parameter (e.g., $T_{skew}$, or more simply "T") value to be configured for burst transmissions of samples obtained by a remote unit (RU). For example, the RU may transmit an indication of a skew time parameter associated with the RU providing compensated samples for symbols of the slot. There may be a delay for communications within the slot (e.g., an interference rejection combining (IRC) delay) based on the RU storing samples for a subset of symbols of the slot. The RU may monitor DMRS transmissions during some symbols of the slot to identify beam weight parameters to be applied to the stored samples. The RU may apply the beam weight parameters to the samples to compensate for channel performance and send the compensated samples to a distributed unit (DU) in a burst transmission. The transmission timing window of the burst transmission may be skewed (e.g., advanced) according to the skew time parameter to mitigate latency delays associated with the RU performing physical layer processing of the samples.

That is, aspects of the techniques described herein provide various mechanisms to eliminate or mitigate latency introduced into uplink communications within the context of a RU/DU split architecture. The techniques improve efficiency of the fronthaul interface be capturing available bandwidth to support skewing the transmission window for compensated sample reporting from the RU to the DU.

Aspects of the disclosure are initially described in the context of wireless communications systems. Aspects of the disclosure are further illustrated by and described with reference to apparatus diagrams, system diagrams, and flowcharts that relate to uplink symbols for DMRS on O-RAN.

Figure 1:
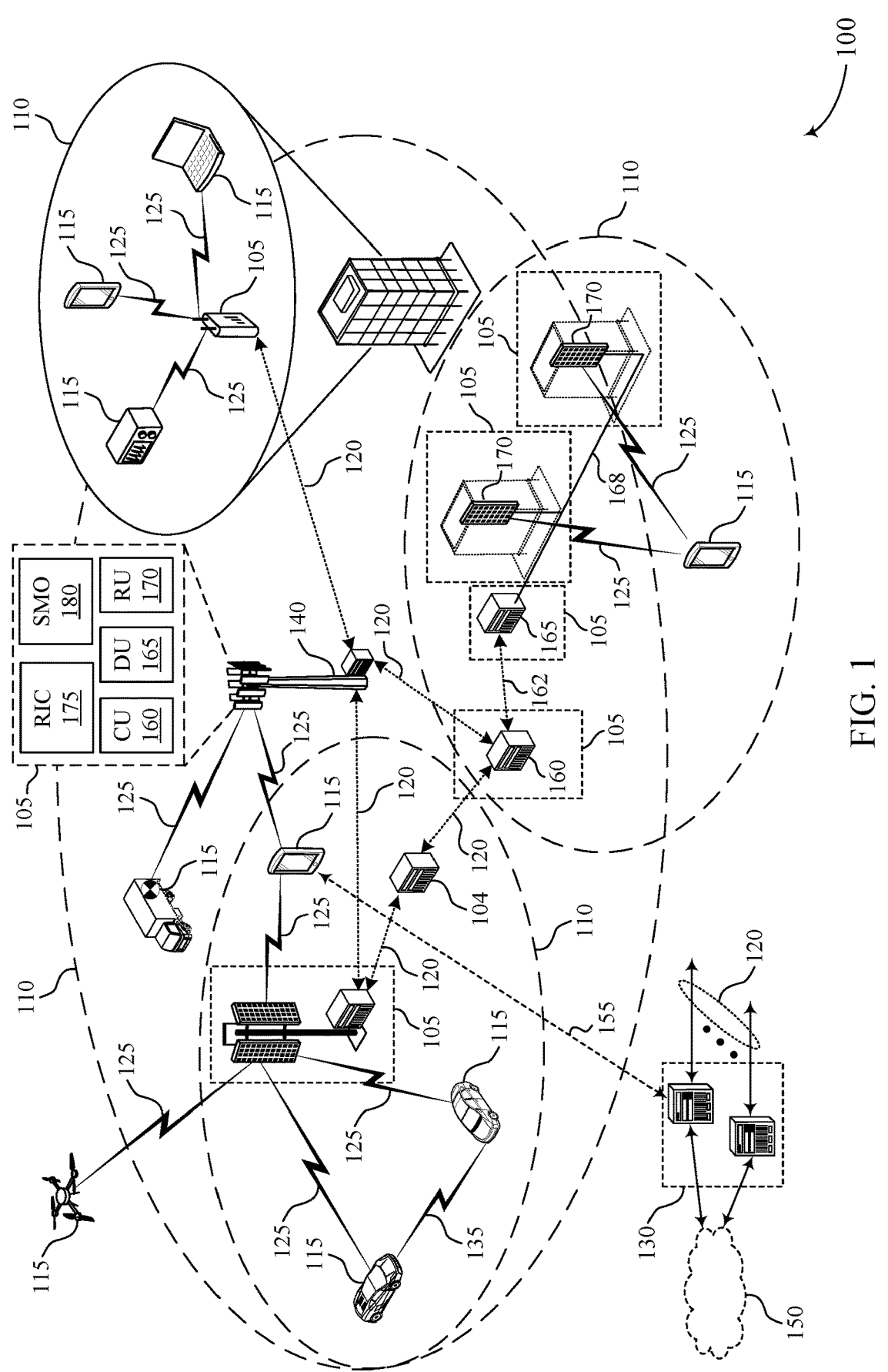
FIG. 1 shows an example of a wireless communications system that supports uplink symbols for demodulation reference signal (DMRS) on open radio access network (O-RAN) in accordance with one or more aspects of the present disclosure.

FIG. 1 shows an example of a wireless communications system 100 that supports uplink symbols for DMRS on O-RAN in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support uplink symbols for DMRS on O-RAN as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A network entity 105 (e.g., the RU function within a network entity 105) may transmit, to a DU, an indication of a skew time parameter associated with providing compensated samples for a plurality of symbols associated with a slot. The network entity 105 may store a set of samples associated with a first subset of the plurality of symbols associated with the slot, the storing based on a processing delay associated with receiving DMRSs during a portion of the first subset of the plurality of symbols associated with the slot. The network entity 105 may transmit, to the DU, a burst of compensated samples for the plurality of symbols in a transmission window that is offset in time from a beginning symbol of the slot according to the skew time parameter.

A network entity 105 (e.g., the DU function within a network entity 105) may receiving, from a remote unit (RU), an indication of a skew time parameter associated with the RU providing compensated samples for a plurality of symbols associated with a slot. The network entity 105 may receive, from the RU, a burst of compensated samples for the plurality of symbols in a transmission window that is offset in time from a beginning symbol of the slot according to the skew time parameter, wherein the burst of compensated samples are based on a set of samples associated with a first subset of the plurality of symbols, the set of samples based on a processing delay associated with DMRSs during a portion of the first subset of the plurality of symbols.

Figure 2:
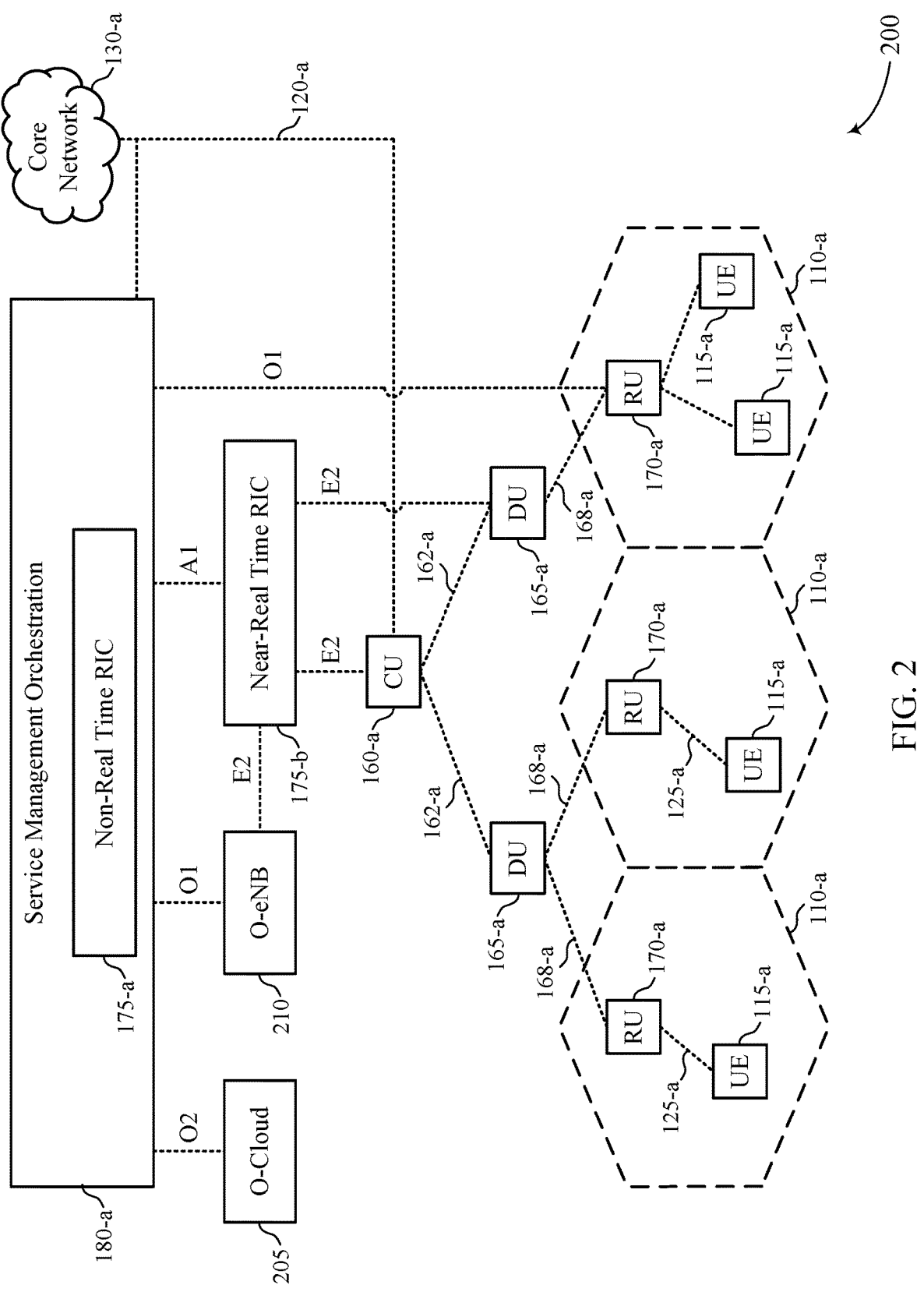
FIG. 2 shows an example of a network architecture that supports uplink symbols for DMRS on O-RAN in accordance with one or more aspects of the present disclosure.

FIG. 2 shows an example of a network architecture 200 (e.g., a disaggregated base station/network entity architecture, a disaggregated RAN architecture) that supports uplink symbols for DMRS on O-RAN in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
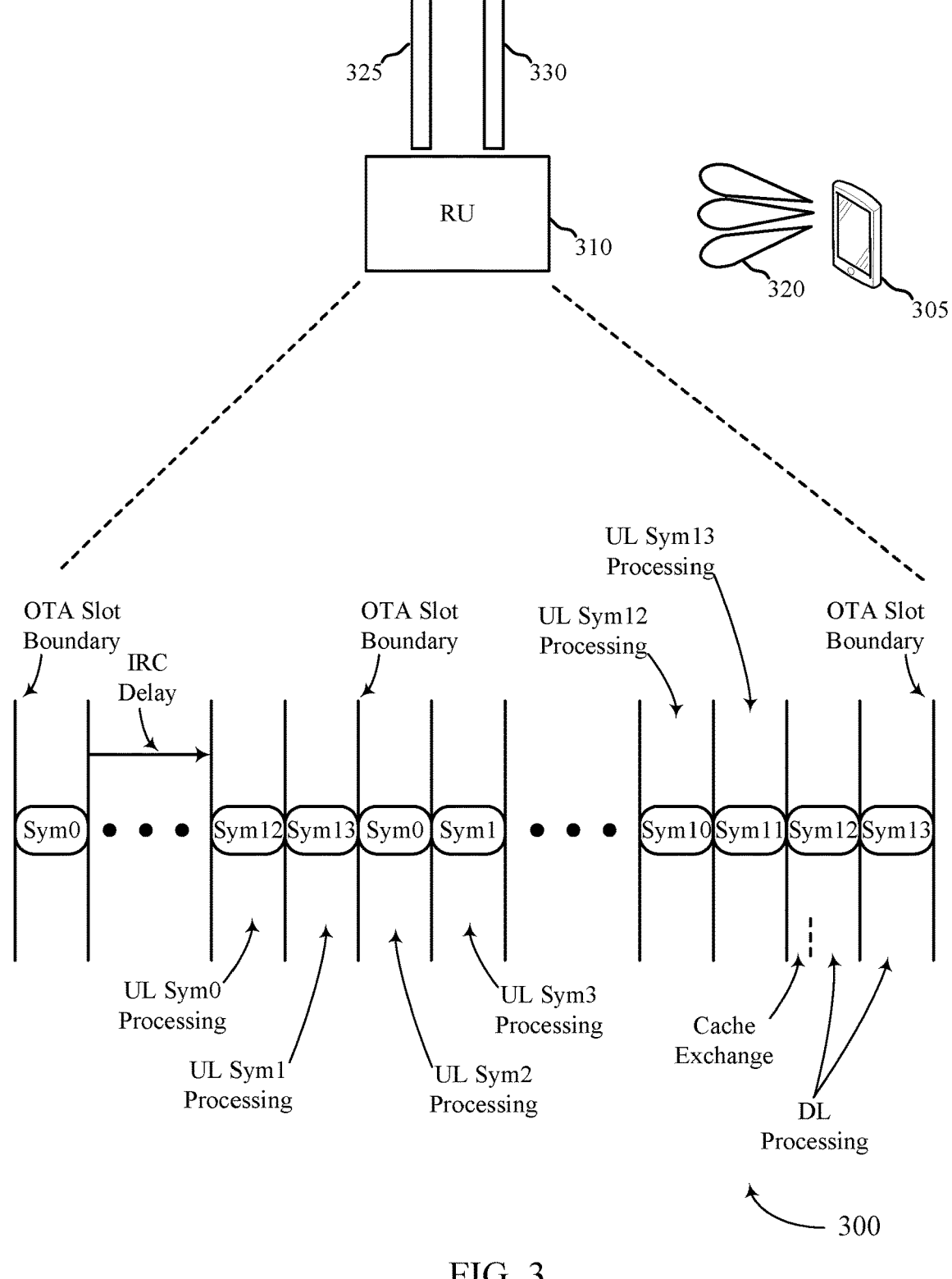
FIG. 3 shows an example of a wireless communications system that supports uplink symbols for DMRS on O-RAN in accordance with one or more aspects of the present disclosure.

FIG. 3 shows an example of a wireless communications system 300 that supports uplink symbols for DMRS on O-RAN in accordance with one or more aspects of the present disclosure. Wireless communications system 300 may implement aspects of wireless communications system 100 and/or aspects of network architecture 200. Wireless communications system 300 may include a UE 305, a RU 310, and a DU 315, which may be examples of the corresponding devices described herein. For example, the RU 310 and the DU 315 may be a part of a network entity.

Wireless communications system 300 may be configured or otherwise support an O-RAN network architecture, such as shown in FIG. 2. For example, the RU 310 may manage various physical layer aspects of the wireless communications between the UE 305 and the network entity. One such non-limiting example may include the RU 310 managing aspects of DMRS 320 transmissions from the UE 305. That is, the UE 305 may transmit or otherwise provide (and the RU 310 may receive or otherwise obtain) transmissions of DMRS 320, such as using beamforming techniques.

That is, the UE 305 may operate in a DMRS beamforming mode having a timeline illustrated in FIG. 3. This may include the UE 305 transmitting multiple DMRS 320 in a sweeping manner towards the RU 310. The DMRS 320 may be transmitted over the uplink channel using different transmit beams of the UE 305 and the RU 310 may apply different receive beams to receive the DMRS 320 transmissions.

Generally, the RU 310 may receive the DMRS 320 transmissions from the UE 305, perform various physical layer processing functions, and then forward the processed samples to the DU 315 via a fronthaul interface. One such example may include the RU 310 compensating the received information to account for channel performance characteristics. The RU 310 may then transmit or otherwise provide the compensated samples or information to the DU 315 for further decoding and information recovery prior to forwarding the decoded information on to a CU function of the network entity. Generally, the DU 315 waits for information from a full slot to be received from the RU 310 before decoding the information conveyed in the slot.

However, and as is shown in FIG. 3, various aspects of this technique may introduce processing delays in the information decoding and recovering process in the DU/RU split. One such processing delay may be referred to as an IRC delay. The IRC delay may be based on the RU 310 receiving the DMRS 320 transmissions during a portion of symbols of the slot. For example, in some examples the DMRS 320 may be transmitted in symbols 1-3 of the slot. The DMRS 320 are used by the RU 310 to identify or otherwise determine the channel performance characteristics of the wireless channel between the UE 305 and the RU 310. The RU 310 may receive the DMRS 320 transmissions during the first few symbol(s) of the slot and use them to identify or otherwise determine beam weighting factors. The beam weighting factors generally identify the amount of compensation that the RU 310 will use to compensate samples received during the slot to mitigate interference caused by the wireless channel.

Accordingly, the RU 310 may store samples (e.g., wireless signals received in one or more REs during the slot) beginning in symbol 0 (Sym0) of the over-the-air (OTA) slot (e.g., at the OTA slot boundary). The RU 310 may continue to store the samples received during each symbol of the slot (e.g., from symbol 0 to symbol 13). During the IRC delay, the RU 310 may determine the channel performance characteristics of the wireless medium based on DMRS 320 (e.g., to identify or otherwise determine the beam weight (e.g., beam weights for the receive beams of the RU 310 and/or for the transmit beams of the UE 305). The IRC delay may generally correspond to the time that the RU 310 takes to identify or otherwise determine the beam weights to be applied to samples received and stored during the slot. In the non-limiting example shown in FIG. 3, the IRC delay is shown as being 11 symbols in duration. However, it is to be understood that the IRC delay may have a different duration other than 11 symbols (e.g., based on the capabilities of the RU 310 and/or the DU 315, on the transmit symbol(s) of DMRS 320, and other factors).

This means that the RU 310 may wait until after expiration of the IRC delay to be ready to compensate the stored samples for the slot. As shown in FIG. 3, this may include the RU 310 beginning to process (e.g., compensate) the samples received during symbol 0 during the symbol 12 of the slot. During symbol 13 of the slot, the RU 310 may begin to process the sample received during symbol 1 of the slot. In some examples, the RU 310 may have a combined UL/DL beam weight cache storage capacity of two slots. Accordingly, the sample stored during symbol 2 of the slot may be processed during symbol 0 of the next slot. This process may continue for symbols 1-11 of the second slot. A portion of symbol 12 of the second slot may be used for cache exchange (e.g., memory processing) of the compensated samples, then with downlink processing occupying the remaining portion of symbol 12 and all of symbol 13 of the second slot.

As can be seen, this process may introduce an 11 symbol delay (e.g., the duration of the IRC delay) into signal processing within the DU/RU split architecture. That is, the large group delay may be added to the system due to the per-symbol metering and post beam weight computational process/timeline.

Accordingly, aspects of the techniques described herein introduce a skew time parameter (e.g., $T_{skew}$) that advances the symbol window that the RU 310 uses to report compensated samples to the DU 315. In some examples, the skew time parameter may have a default value of "0" to ensure compatibility with existing O-RAN DU functionality.

For example, at 325 the RU 310 may transmit or otherwise provide (and the DU 315 may receive or otherwise obtain) an indication of the skew time parameter. The RU 310 may use the skew time parameter to transmit or otherwise provide compensated samples for symbols of a slot. The indication of the skew time parameter may be provided via a fronthaul interface.

The RU 310 may store samples for a first subset of symbols of the slot (e.g., during the IRC delay). That is, the RU 310 may store the samples received during symbols of the IRC delay. The samples may be stored in a memory, a cache, or other storage means.

Broadly, the skew time parameter may be set to a value based on various factors. For example, one factor may be the available bandwidth of the fronthaul interface. The fronthaul has a finite amount of traffic that it can support, and some scenarios may result in exhaustion of the available bandwidth. In this example (e.g., when the available bandwidth is low or otherwise fails to satisfy a threshold), the duration of the skew time parameter may be set to "0" to avoid further loading of the fronthaul. Additionally, or alternatively, the skew time parameter may be set to "0" based on compatibility issues (e.g., supported capabilities) between the RU 310 and/or the DU 315. Other factors may warrant the skew time parameter being set to a "0" value. When the skew time parameter is set to "0," this may mean that the RU 310 may transmit the compensated sample obtained during symbol 0—after processing during symbol 12—to the DU 315 during symbol 13 of the slot. Correspondingly, the RU 310 may transmit the compensated sample obtained during symbol 1—after processing during symbol 13—during symbol 0 of the next slot. This linear transmission of the compensated samples at the beginning of each symbol that follows the processing symbol may continue until all compensates samples from the slot is reported to the DU 315.

In other scenarios the skew time parameter may be set to a non-zero value (e.g., $T_{skew}>0$). For example, the skew time parameter may be set to a fixed value (e.g., x μs) or to a relative value (e.g., y percent of the symbol duration). Broadly, the skew time parameter may advance or otherwise move forward in the time domain the transmission time window during which the RU 310 transmits or otherwise provides the compensated samples to the DU 315. In some examples, the skew time parameter may be reset to zero at the slot boundary. Accordingly, the RU 310 may transmit the compensated sample received during symbol 0 at the first symbol following the IRC delay (e.g., beginning at symbol 12). However, the skew time parameter may be applied when transmitting subsequent compensated samples stored during the IRC delay. For example, the RU 310 may transmit the compensated sample received during symbol 1 during a transmission time window that is advanced in the time domain relative to the symbol boundary. This may include the transmission time window for the compensated sample from symbol 1 being advanced into symbol 12 according to the skew time parameter (e.g., rather than beginning at symbol 13 when the skew time parameter is set to "0"). This may reduce the latency for uplink communications in the DU/RU split architecture framework.

In some examples, the skew time parameter may be based on capability signaling exchanged between the RU 310 and the DU 315. For example, the RU 310 may transmit or otherwise provide a capability message to the DU 315 identifying the supported skew time parameters of the RU 310. That capability message may indicate an amount (e.g., minimum and/or maximum) of supported skew time parameters in absolute form (e.g., x μs) and/or in a relative form (e.g., y percent of the symbol duration). Additionally, or alternatively, the RU 310 may receive skew time capability information from the DU 315 that identifies the supported skew time parameters of the DU 315. A given skew time parameter may be selected or otherwise identified based on such capability signaling.

The RU 310 may compensate the stored set of samples, such as by applying beam weights to the stored samples. For example, the RU 310 may identify or otherwise determine the beam weights based on DMRS 320 transmissions from the UE 305 during some symbol(s) of the slot. The beam weights generally compensate for the channel-induced interference to the sample. Compensating the stored samples using the beam weights may create compensated samples. That is, the compensation of the samples may include the RU 310 performing the lower PHY layer processing of the samples before passing those compensated samples to the DU 315 for higher PHY, L2, and other layer processing within the O-RAN. As discussed, on some examples the DU 315 may not begin to process the compensated samples until all of the samples from a slot have been received from the RU 310. The RU 310 may compute the beam weights for the receive beams of the RU 310 and/or for the transmit beams used by the UE 305.

Accordingly, at 330 the RU 310 may transmit or otherwise provide (and the DU 315 may receive or otherwise obtain) a burst of compensated samples for the symbols of the slot. The burst of compensated samples may be provided in a burst transmission and during the transmission window that is offset in the time domain from a beginning symbol of the slot according to the skew time parameter. That is, the skew time parameter may advance the transmission window for a given sample relative to the symbol boundary during which the compensated sample is traditionally reported.

Figure 4:
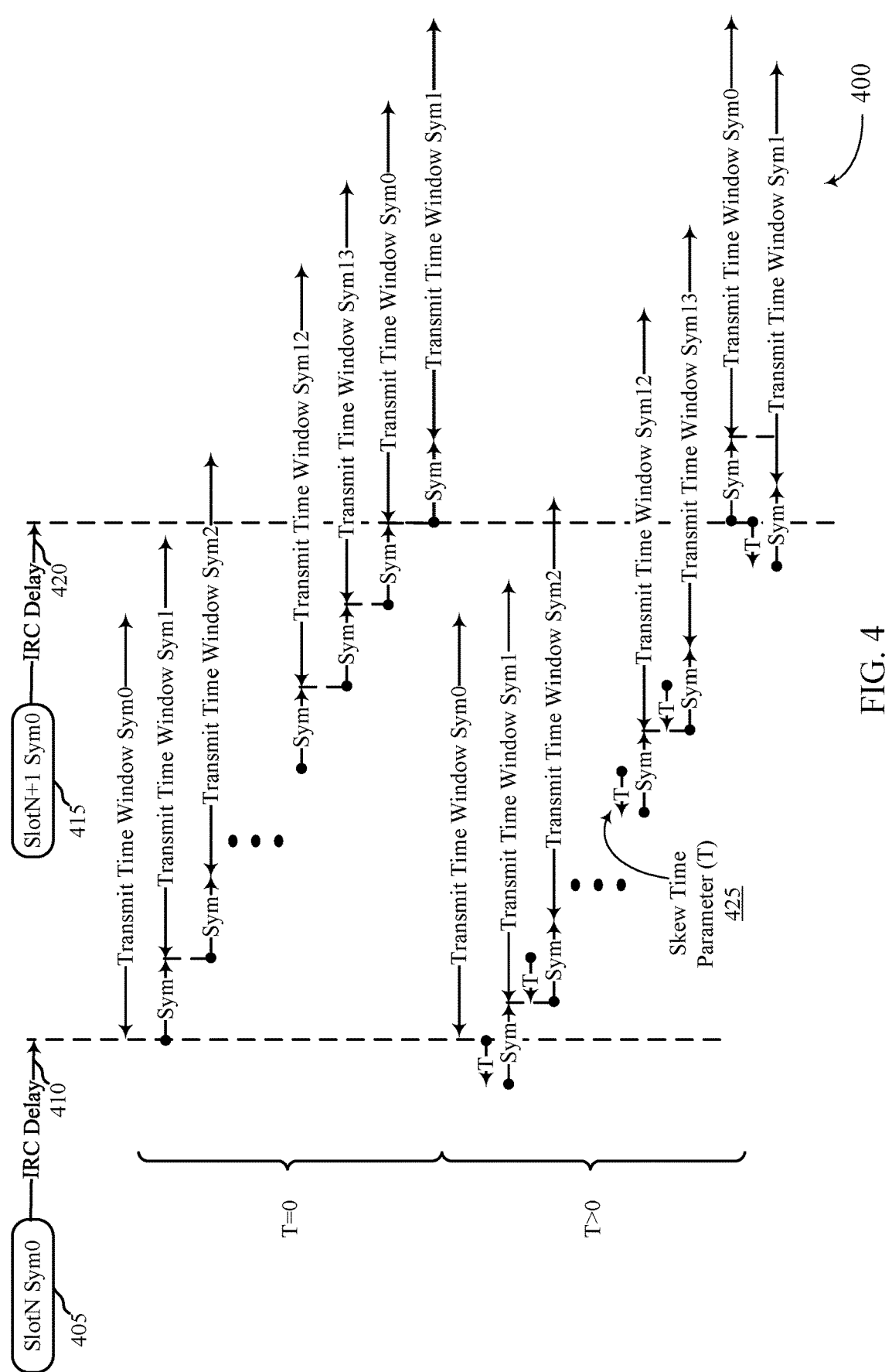
FIG. 4 shows an example of a skewing scheme that supports uplink symbols for DMRS on O-RAN in accordance with one or more aspects of the present disclosure.

FIG. 4 shows an example of a skewing scheme 400 that supports uplink symbols for DMRS on O-RAN in accordance with one or more aspects of the present disclosure. Skewing scheme 400 may implement aspects of wireless communications system 100 and/or wireless communications system 300, and/or aspects of network architecture 200. Aspects of skewing scheme 400 may be implemented at or implemented by a network entity, which may be an example of the corresponding device described herein. For example, aspects of skewing scheme 400 may be implemented at or implemented by a RU function and/or DU function of the network entity.

As discussed above, aspects of the techniques described herein provide for a skew time parameter 425 (e.g., $T_{skew}$, shown as T in FIG. 4) to be configured between the RU and DU. For example, the skew time parameter 425 may be transmitted to the DU via an indication carried on the fronthaul. The skew time parameter 425 may generally be used by the RU for providing compensates samples for symbol(s) of a slot 405 (e.g., slot N). This may be based on the slot 405 including DMRS transmissions from a UE to the RU (e.g., using beamforming techniques) in one or more of the early symbols of the slot 405. The RU may store the samples (e.g., the signals received) during some or all of the symbols of the slot 405 based in response to a processing delay associated with receiving DMRS(s) during some symbol(s) of the slot 405. In the non-limiting example shown in FIG. 4, this processing delay is illustrated as IRC delay 410 associated with slot 405. The IRC delay 410 may include the RU storing the signal(s) received during the slot 405 (e.g., the samples). The RU may use the DMRS transmissions to identify or otherwise determine beam weights to be applied to receive beams of the RU and/or to transmit beams of the UE. The beam weights may be weighting factors used to compensate for channel interference or other degradation in the stored samples. That is, application of the beam weights to the stored samples may eliminate or mitigate channel interference associated with each stored sample.

The RU may transmit or otherwise provide a burst of compensated samples (e.g., the compensated samples in a burst transmission) to the DU for some or all of the symbols of the slot. Skewing scheme 400 illustrates two examples of how the RU may transmit the burst of compensated samples to the DU according to the skew time parameter 425.

The first scenario illustrated is for the example where the skew time parameter 425 is set to a "0" (zero) value. In this scenario, the RU may store the samples received during the initial symbols of the slot 405. The number of initial symbols during which the samples are stored may be based on the duration of IRC delay 410. For example, the RU may store the samples during each symbol of the IRC delay 410. During this IRC delay 410, the RU may be determining beam weights from the DMRS transmissions from the UE and may begin applying the beam weights to the stored samples. This may result in the RU having compensated samples to report to the DU upon expiration of the IRC delay 410. In the example shown, the skew time parameter 425 is set to a value of "O" indicating that the RU is to report the compensated results to the DU via the fronthaul interface as shown in FIG. 4.

In particular, the transmit time window for the RU to report the compensated sample collected during symbol 0 may begin in the first symbol following expiration of the IRC delay 410. The transmit time window for the RU to report the compensated sample collected during symbol 1 may begin in the next occurring symbol (e.g., in the symbol after the first symbol that follows the IRC delay 410). That is, the transmit time window for the sample collected during symbol 1 may begin at the symbol boundary. This may continue in this linear fashion where each subsequent transmit time window begins one symbol duration after the previous transmit time window. However, it is to be understood that in some examples the IRC delay may have a duration that is not a multiple of the symbol duration. For example, a time associated with the DMRS (e.g., $T_{dmrs}$) may also be considered an IRC delay where the transmission time window for consecutive symbols are offset by the symbol time.

This may also continue into the next slot (e.g., slot 415, corresponding to slot N+1). For example, the transmit time window for the RU to report the compensated sample collected during symbol 12 (or 11) may begin during a symbol 0 of slot 415. For example, the IRC delay of 11 symbols may include the transmit time window for symbol 11 being offset by 11 symbols (e.g., slot N+1, Symbol 8). This may continue such that the transmit time window for the RU to report the compensated sample collected for symbol 0 of slot 415 begins in the first symbol following the IRC delay 420 of slot 415. That is, the RU may reset the transmit time window for compensated samples collected during symbol 0 of a slot back to the symbol boundary for the first symbol after the IRC delay for that slot.

Skewing scheme 400 also illustrates an example where the skew time parameter 425 is set to a non-zero value (e.g., $T_{skew}$>0). That is, the skew time parameter 425 may be set to a value based on capability signaling between the RU and DU, based on fronthaul load (e.g., the available bandwidth), or other factors considered by the RU and/or DU. The skew time parameter 425 may generally identify the amount of time that the transmit time window for a given compensated sample is moved forward to reduce reporting times for the compensated samples stored during the slot.

For example, the transmit time window for the RU to report the compensated sample collected during symbol 0 of slot 405 may begin at the symbol boundary of the first symbol following expiration of IRC delay 410. However, the transmit time window for the RU to report the compensated sample collected during symbol 1 of slot 405 may begin at a time that is skewed ahead of the next symbol boundary by the skew time parameter 425. That is, rather than wait for the next symbol boundary (e.g., wait one full symbol duration), the transmit time window for the RU to report the compensated sample based on the sample received during symbol 1 may be moved forward in the time domain in order to begin earlier than when the skew time parameter 425 is set to "0."

The transmit time window for the RU to report the compensated sample collected during symbol 2 of slot 405 may also be moved forward in the time domain (e.g., may begin earlier) by the amount of skew time parameter 425. This process of skewing the transmit time windows during which the RU may report the compensated samples to the DU may continue for the remaining compensated samples during slot 405 and into slot 415. However, the skew time parameter may again be reset to "0" for the RU to report the compensated sample collected during symbol 0 of slot 415 to the first symbol boundary following IRC delay 420 of slot 415. That is, the skew time parameter may be a static value and unchanged. The transmission windows may again be reset at the slot boundary so that slot N+1, symbol 0 again uses the fixed IRC delay from its OTA boundary.

Accordingly, skewing scheme 400 illustrates two non-limiting examples where the transmit time windows used by the RU to report compensated samples to a DU via a fronthaul interface are moved forward in the time domain by the amount of the skew time parameter 425. This approach may mitigate latency issues for uplink communications in the context of the DU/RU split architecture.

Figure 5:
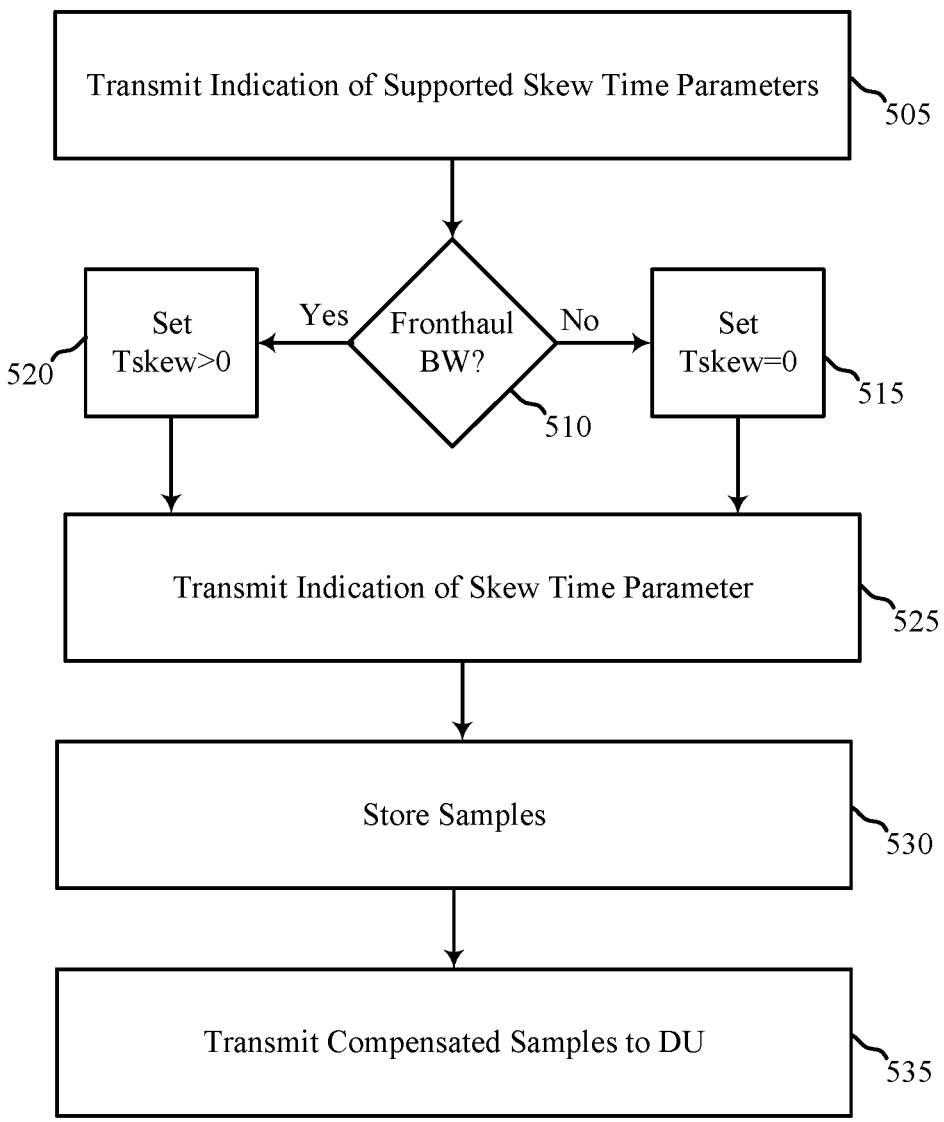
FIG. 5 shows an example of a method that supports uplink symbols for DMRS on O-RAN in accordance with one or more aspects of the present disclosure.

FIG. 5 shows an example of a method 500 that supports uplink symbols for DMRS on O-RAN in accordance with one or more aspects of the present disclosure. Method 500 may implement aspects of wireless communications system 100, wireless communications system 300, aspects of network architecture 200, and/or aspects of skewing scheme 400. Aspects of method 500 may be implemented at or implemented by a network entity, which may be an example of the corresponding device described herein. For example, aspects of method 500 may be implemented at or implemented by a RU function and/or DU function of the network entity.

At 505, the RU may transmit an indication of its supported skew time parameters to the DU. Additionally, or alternatively, the RU may receive from the DU an indication of the skew time parameters that the DU supports. Such capability signaling may be exchanged via a fronthaul interface.

At 510, the RU may identify or otherwise determine whether there is a sufficient available bandwidth in the fronthaul interface between the RU and the DU. For example, the available bandwidth may be based on a fixed amount of bandwidth that is available for use and/or based on a relative amount of bandwidth (e.g., y percent of the bandwidth is available) associated with the fronthaul interface.

If the available bandwidth fails to satisfy a defined threshold, at 515 the RU may set the skew time parameter value to "0." If the available bandwidth satisfies the defined threshold, at 520 the RU may set the skew time parameter to a value that is greater than zero (e.g., introduce the skew time parameter to the compensated results reporting).

Although method 500 illustrates an example where the value of the skew time parameter is based on the available bandwidth of the fronthaul interface, it is to be understood that other considerations may be used to set or otherwise select the skew time parameter. Non-limiting examples of such other considerations include capability reporting exchanged between the RU and the DU indicating which skew time parameters each node supports, an amount of compensated samples are to be reported to the DU, the latency associated with uplink communications, and other considerations.

At 525, the RU may transmit an indication of a skew time parameter to the DU. The skew time parameter may be associated with the RU providing compensated samples for symbol(s) of a slot. The indication of the skew time parameter may be provided via a fronthaul interface between the RU and the DU. The skew time parameter may be selected based on the supported skew time parameters of the RU and/or the DU. The skew time parameter indication may signal that the RU is to begin applying the skew time parameter when reporting compensated samples to the DU.

At 530, the RU may samples collected during some or all of the symbols of a slot. The samples may be stored based on an IRC delay during the slot. The IRC delay may be based on the RU receiving and storing samples from a UE. The samples may include DMRS transmissions, in some symbols, that are used for beam weight determination by the RU. The RU may use the beam weights to compensate the stored samples (e.g., to mitigate or eliminate channel-induced interference from the samples).

At 535, the RU may transmit the compensated samples to the DU. The RU may transmit the compensated samples to the DU in a burst transmission where the transmit time window(s) used for the burst transmission are accelerated or otherwise moved forward in the time domain to begin early than when the skew time parameter is set to "0." The acceleration or forward movement of the transmission window (e.g., the transmit time window) may be relative to the beginning of a symbol of the slot (or a second slot) according to the skew time parameter.

Figure 6:
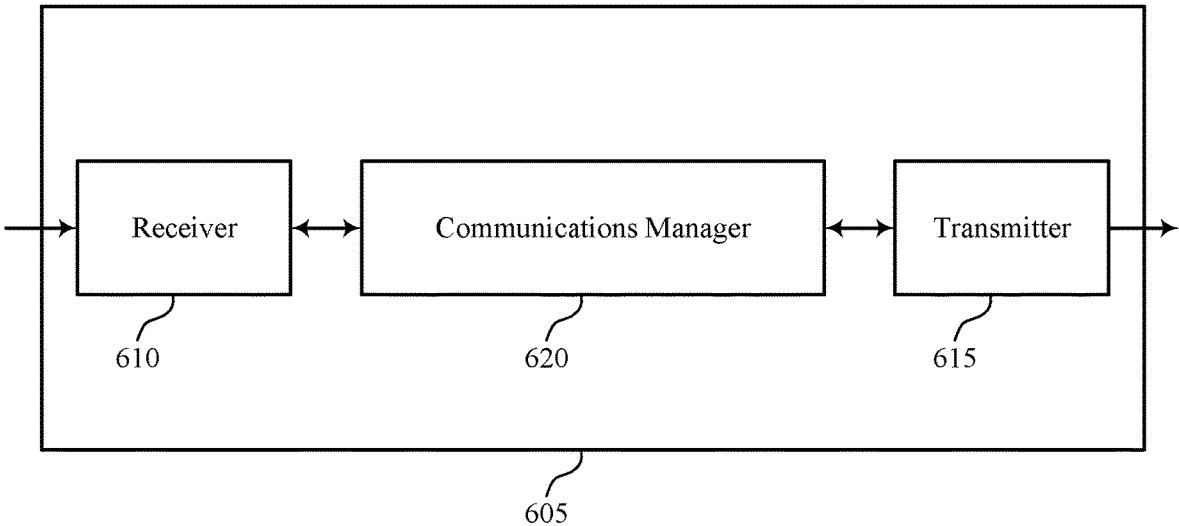
FIGS. 6 and 7 show block diagrams of devices that support uplink symbols for DMRS on O-RAN in accordance with one or more aspects of the present disclosure.

FIG. 6 shows a block diagram 600 of a device 605 that supports uplink symbols for DMRS on O-RAN in accordance with one or more aspects of the present disclosure. The device 605 may be an example of aspects of a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of uplink symbols for DMRS on O-RAN as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for transmitting, to a distributed unit (DU), an indication of a skew time parameter associated with providing compensated samples for a set of multiple symbols associated with a slot. The communications manager 620 is capable of, configured to, or operable to support a means for storing a set of samples associated with a first subset of the set of multiple symbols associated with the slot, the storing based on a processing delay associated with receiving DMRSs during a portion of the first subset of the set of multiple symbols associated with the slot. The communications manager 620 is capable of, configured to, or operable to support a means for transmitting, to the DU, a burst of compensated samples for the set of multiple symbols in a transmission window that is offset in time from a beginning symbol of the slot according to the skew time parameter.

Additionally, or alternatively, the communications manager 620 may support wireless communications in accordance with examples as disclosed herein. For example, the communications manager 620 is capable of, configured to, or operable to support a means for receiving, from a remote unit (RU), an indication of a skew time parameter associated with the RU providing compensated samples for a set of multiple symbols associated with a slot. The communications manager 620 is capable of, configured to, or operable to support a means for receiving, from the RU, a burst of compensated samples for the set of multiple symbols in a transmission window that is offset in time from a beginning symbol of the slot according to the skew time parameter, where the burst of compensated samples are based on a set of samples associated with a first subset of the set of multiple symbols, the set of samples based on a processing delay associated with DMRSs during a portion of the first subset of the set of multiple symbols.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for adding a skew time parameter to fronthaul-based reporting of compensated samples from a RU to a DU. The skew time parameter moves the transmission window forward during which the RU can report the compensated samples to the DU.

Figure 7:
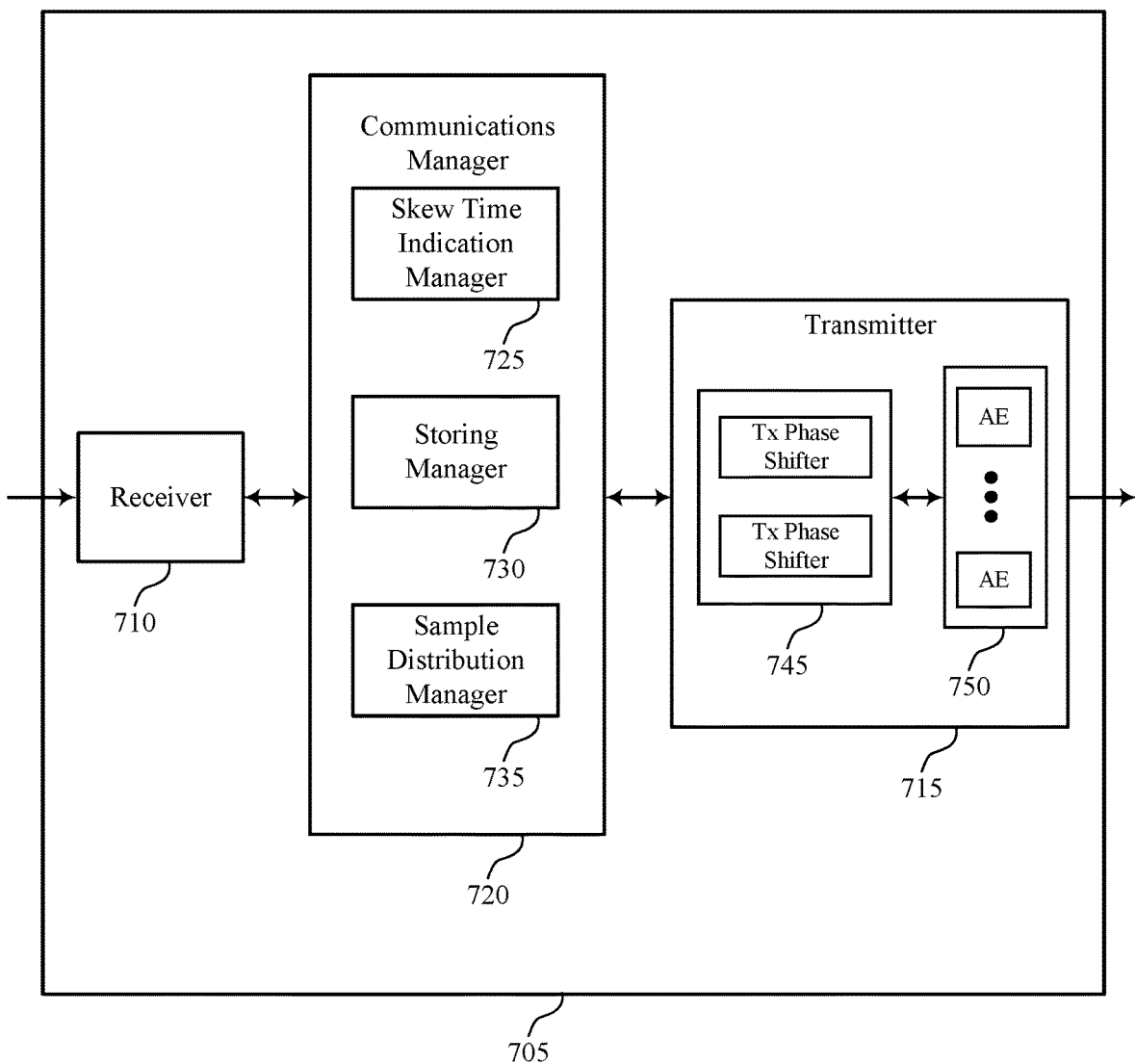

FIG. 7 shows a block diagram 700 of a device 705 that supports uplink symbols for DMRS on O-RAN in accordance with one or more aspects of the present disclosure. The device 705 may be an example of aspects of a device 605 or a network entity 105 as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of uplink symbols for DMRS on O-RAN as described herein. For example, the communications manager 720 may include a skew time indication manager 725, a storing manager 730, a sample distribution manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The skew time indication manager 725 is capable of, configured to, or operable to support a means for transmitting, to a distributed unit (DU), an indication of a skew time parameter associated with providing compensated samples for a set of multiple symbols associated with a slot. The storing manager 730 is capable of, configured to, or operable to support a means for storing a set of samples associated with a first subset of the set of multiple symbols associated with the slot, the storing based on a processing delay associated with receiving DMRSs during a portion of the first subset of the set of multiple symbols associated with the slot. The sample distribution manager 735 is capable of, configured to, or operable to support a means for transmitting, to the DU, a burst of compensated samples for the set of multiple symbols in a transmission window that is offset in time from a beginning symbol of the slot according to the skew time parameter.

Additionally, or alternatively, the communications manager 720 may support wireless communications in accordance with examples as disclosed herein. The skew time indication manager 725 is capable of, configured to, or operable to support a means for receiving, from a remote unit (RU), an indication of a skew time parameter associated with the RU providing compensated samples for a set of multiple symbols associated with a slot. The sample distribution manager 735 is capable of, configured to, or operable to support a means for receiving, from the RU, a burst of compensated samples for the set of multiple symbols in a transmission window that is offset in time from a beginning symbol of the slot according to the skew time parameter, where the burst of compensated samples are based on a set of samples associated with a first subset of the set of multiple symbols, the set of samples based on a processing delay associated with DMRSs during a portion of the first subset of the set of multiple symbols.

The phase shifter 745 may provide a configurable phase shift or phase offset to a corresponding RF signal to be transmitted on a respective antenna element. The settings of each of the phase shifters 745 may be independent meaning that each can be set to provide a desired amount of phase shift or the same amount of phase shift or some other configuration. A modem or other processor may have at least one control line connected to each of the phase shifters 745 and which may be used to configure the phase shifters 745 to provide a desired amounts of phase shift or phase offset between antenna elements 750.

In at least one embodiment, changing or receiving a transmit or receive beam comprises adjusting relative phase shifts for signals on different antenna elements. The relative phase shifts may be achieved by the modem adjusting the phase shift of one or more phase shifters. The set of phases for different phase shifters (and corresponding antenna elements) may comprise the spatial receive parameters or spatial transmit parameters for a respective beam. To receive or transmit on a beam, the spatial parameters may need to be set before the beginning of the transmitting or receiving.

Figure 8:
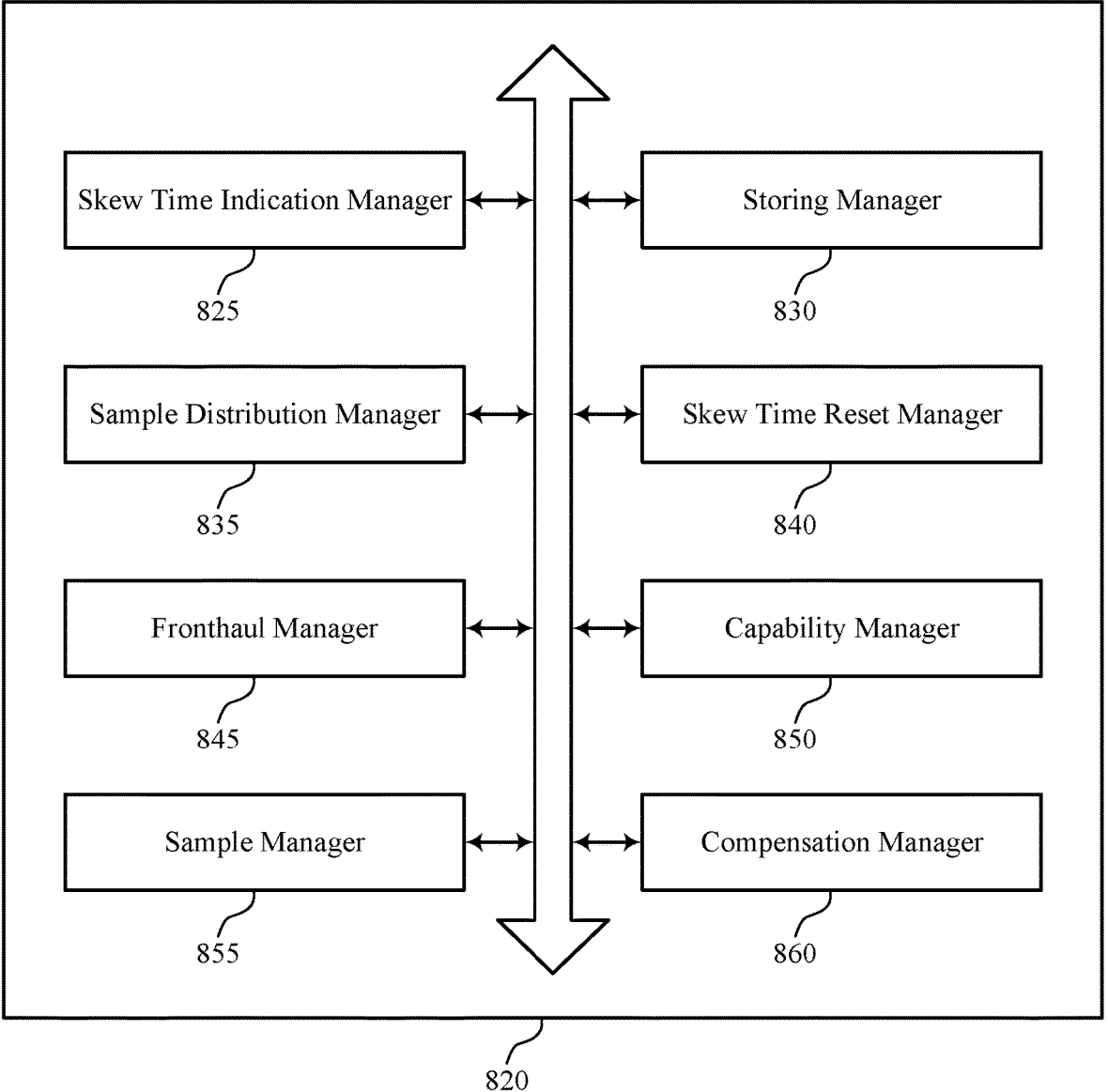
FIG. 8 shows a block diagram of a communications manager that supports uplink symbols for DMRS on O-RAN in accordance with one or more aspects of the present disclosure.

FIG. 8 shows a block diagram 800 of a communications manager 820 that supports uplink symbols for DMRS on O-RAN in accordance with one or more aspects of the present disclosure. The communications manager 820 may be an example of aspects of a communications manager 620, a communications manager 720, or both, as described herein. The communications manager 820, or various components thereof, may be an example of means for performing various aspects of uplink symbols for DMRS on O-RAN as described herein. For example, the communications manager 820 may include a skew time indication manager 825, a storing manager 830, a sample distribution manager 835, a skew time reset manager 840, a fronthaul manager 845, a capability manager 850, a sample manager 855, a compensation manager 860, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications in accordance with examples as disclosed herein. The skew time indication manager 825 is capable of, configured to, or operable to support a means for transmitting, to a distributed unit (DU), an indication of a skew time parameter associated with providing compensated samples for a set of multiple symbols associated with a slot. The storing manager 830 is capable of, configured to, or operable to support a means for storing a set of samples associated with a first subset of the set of multiple symbols associated with the slot, the storing based on a processing delay associated with receiving DMRSs during a portion of the first subset of the set of multiple symbols associated with the slot. The sample distribution manager 835 is capable of, configured to, or operable to support a means for transmitting, to the DU, a burst of compensated samples for the set of multiple symbols in a transmission window that is offset in time from a beginning symbol of the slot according to the skew time parameter.

In some examples, the skew time reset manager 840 is capable of, configured to, or operable to support a means for resetting the skew time parameter at a slot boundary occurring after a last symbol of the slot.

In some examples, the fronthaul manager 845 is capable of, configured to, or operable to support a means for setting the skew time parameter based on an available bandwidth for a fronthaul interface between the RU and the DU. In some examples, the fronthaul manager 845 is capable of, configured to, or operable to support a means for setting the skew time parameter to a zero-value based on a failure of the available bandwidth for the fronthaul interface to satisfy a defined threshold.

In some examples, the capability manager 850 is capable of, configured to, or operable to support a means for transmitting a capability message to the DU identifying a set of supported skew time parameters, where the skew time parameter is selected based on the capability message.

In some examples, the sample manager 855 is capable of, configured to, or operable to support a means for receiving the DMRSs during the first subset of the set of multiple symbols. In some examples, the sample manager 855 is capable of, configured to, or operable to support a means for compensating each sample in the set of samples according to the DMRSs to obtain the burst of compensated samples.

In some examples, the compensation manager 860 is capable of, configured to, or operable to support a means for computing a set of multiple beam weights corresponding to a respective set of multiple receive beams at the RU. In some examples, the compensation manager 860 is capable of, configured to, or operable to support a means for compensating the set of samples by equalizing the set of samples according to the set of multiple beam weights. In some examples, the set of multiple symbols associated with the slot include all symbols of the slot.

In some examples, the capability manager 850 is capable of, configured to, or operable to support a means for receiving skew time capability information from the DU, where the skew time parameter is selected based on the skew time capability information.

Additionally, or alternatively, the communications manager 820 may support wireless communications in accordance with examples as disclosed herein. In some examples, the skew time indication manager 825 is capable of, configured to, or operable to support a means for receiving, from a remote unit (RU), an indication of a skew time parameter associated with the RU providing compensated samples for a set of multiple symbols associated with a slot. In some examples, the sample distribution manager 835 is capable of, configured to, or operable to support a means for receiving, from the RU, a burst of compensated samples for the set of multiple symbols in a transmission window that is offset in time from a beginning symbol of the slot according to the skew time parameter, where the burst of compensated samples are based on a set of samples associated with a first subset of the set of multiple symbols, the set of samples based on a processing delay associated with DMRSs during a portion of the first subset of the set of multiple symbols.

In some examples, the skew time reset manager 840 is capable of, configured to, or operable to support a means for resetting the skew time parameter at a slot boundary occurring after a last symbol of the slot.

In some examples, the fronthaul manager 845 is capable of, configured to, or operable to support a means for setting the skew time parameter based on an available bandwidth for a fronthaul interface between the RU and the DU. In some examples, the fronthaul manager 845 is capable of, configured to, or operable to support a means for setting the skew time parameter to a zero-value based on a failure of the available bandwidth for the fronthaul interface failing to satisfy a defined threshold.

In some examples, the capability manager 850 is capable of, configured to, or operable to support a means for receiving a capability message from the RU identifying a set of supported skew time parameters, where the skew time parameter is selected based on the capability message. In some examples, the set of multiple symbols associated with the slot include all symbols of the slot.

In some examples, the capability manager 850 is capable of, configured to, or operable to support a means for transmitting skew time capability information to the RU, where the skew time parameter is selected based on the skew time capability information.

Figure 9:
FIG. 9 shows a diagram of a system including a device that supports uplink symbols for DMRS on O-RAN in accordance with one or more aspects of the present disclosure.

FIG. 9 shows a diagram of a system 900 including a device 905 that supports uplink symbols for DMRS on O-RAN in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., a communication link 125, a backhaul communication link 120, a midhaul communication link 162, a fronthaul communication link 168).

The at least one memory 925 may include RAM, ROM, or any combination thereof. The at least one memory 925 may store computer-readable, computer-executable code 930 including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting uplink symbols for DMRS on O-RAN). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some examples, the at least one processor 935 may include multiple processors and the at least one memory 925 may include multiple memories. One or more of the multiple processors may be coupled with one or more of the multiple memories, which may, individually or collectively, be configured to perform various functions herein. In some examples, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs. The processing system may be configured to perform one or more of the functions described herein. As such, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for transmitting, to a distributed unit (DU), an indication of a skew time parameter associated with providing compensated samples for a set of multiple symbols associated with a slot. The communications manager 920 is capable of, configured to, or operable to support a means for storing a set of samples associated with a first subset of the set of multiple symbols associated with the slot, the storing based on a processing delay associated with receiving DMRSs during a portion of the first subset of the set of multiple symbols associated with the slot. The communications manager 920 is capable of, configured to, or operable to support a means for transmitting, to the DU, a burst of compensated samples for the set of multiple symbols in a transmission window that is offset in time from a beginning symbol of the slot according to the skew time parameter.

Additionally, or alternatively, the communications manager 920 may support wireless communications in accordance with examples as disclosed herein. For example, the communications manager 920 is capable of, configured to, or operable to support a means for receiving, from a remote unit (RU), an indication of a skew time parameter associated with the RU providing compensated samples for a set of multiple symbols associated with a slot. The communications manager 920 is capable of, configured to, or operable to support a means for receiving, from the RU, a burst of compensated samples for the set of multiple symbols in a transmission window that is offset in time from a beginning symbol of the slot according to the skew time parameter, where the burst of compensated samples are based on a set of samples associated with a first subset of the set of multiple symbols, the set of samples based on a processing delay associated with DMRSs during a portion of the first subset of the set of multiple symbols.

By including or configuring the communications manager 920 in accordance with examples as described herein, the device 905 may support techniques for adding a skew time parameter to fronthaul-based reporting of compensated samples from a RU to a DU. The skew time parameter moves the transmission window forward during which the RU can report the compensated samples to the DU.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of uplink symbols for DMRS on O-RAN as described herein, or the at least one processor 935 and the at least one memory 925 may be otherwise configured to, individually or collectively, perform or support such operations.

FIG. 10 shows a flowchart illustrating a method 1000 that supports uplink symbols for DMRS on O-RAN in accordance with aspects of the present disclosure. The operations of the method 1000 may be implemented by a network entity or its components as described herein. For example, the operations of the method 1000 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1005, the method may include transmitting, to a distributed unit (DU), an indication of a skew time parameter associated with providing compensated samples for a set of multiple symbols associated with a slot. The operations of block 1005 may be performed in accordance with examples as disclosed herein. In some examples, aspects of the operations of 1005 may be performed by a skew time indication manager 825 as described with reference to FIG. 8.

At 1010, the method may include storing a set of samples associated with a first subset of the set of multiple symbols associated with the slot, the storing based on a processing delay associated with receiving DMRSs during a portion of the first subset of the set of multiple symbols associated with the slot. The operations of block 1010 may be performed in accordance with examples as disclosed herein. In some examples, aspects of the operations of 1010 may be performed by a storing manager 830 as described with reference to FIG. 8.

At 1015, the method may include transmitting, to the DU, a burst of compensated samples for the set of multiple symbols in a transmission window that is offset in time from a beginning symbol of the slot according to the skew time parameter. The operations of block 1015 may be performed in accordance with examples as disclosed herein. In some examples, aspects of the operations of 1015 may be performed by a sample distribution manager 835 as described with reference to FIG. 8.

FIG. 11 shows a flowchart illustrating a method 1100 that supports uplink symbols for DMRS on O-RAN in accordance with aspects of the present disclosure. The operations of the method 1100 may be implemented by a network entity or its components as described herein. For example, the operations of the method 1100 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1105, the method may include transmitting, to a distributed unit (DU), an indication of a skew time parameter associated with providing compensated samples for a set of multiple symbols associated with a slot. The operations of block 1105 may be performed in accordance with examples as disclosed herein. In some examples, aspects of the operations of 1105 may be performed by a skew time indication manager 825 as described with reference to FIG. 8.

At 1110, the method may include storing a set of samples associated with a first subset of the set of multiple symbols associated with the slot, the storing based on a processing delay associated with receiving DMRSs during a portion of the first subset of the set of multiple symbols associated with the slot. The operations of block 1110 may be performed in accordance with examples as disclosed herein. In some examples, aspects of the operations of 1110 may be performed by a storing manager 830 as described with reference to FIG. 8.

At 1115, the method may include transmitting, to the DU, a burst of compensated samples for the set of multiple symbols in a transmission window that is offset in time from a beginning symbol of the slot according to the skew time parameter. The operations of block 1115 may be performed in accordance with examples as disclosed herein. In some examples, aspects of the operations of 1115 may be performed by a sample distribution manager 835 as described with reference to FIG. 8.

At 1120, the method may include resetting the skew time parameter at a slot boundary occurring after a last symbol of the slot. The operations of block 1120 may be performed in accordance with examples as disclosed herein. In some examples, aspects of the operations of 1120 may be performed by a skew time reset manager 840 as described with reference to FIG. 8.

FIG. 12 shows a flowchart illustrating a method 1200 that supports uplink symbols for DMRS on O-RAN in accordance with aspects of the present disclosure. The operations of the method 1200 may be implemented by a network entity or its components as described herein. For example, the operations of the method 1200 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1205, the method may include setting the skew parameter based on an available bandwidth for a fronthaul interface between the RU and the DU. The operations of block 1205 may be performed in accordance with examples as disclosed herein. In some examples, aspects of the operations of 1205 may be performed by a fronthaul manager 845 as described with reference to FIG. 8.

At 1210, the method may include transmitting, to a distributed unit (DU), an indication of a skew time parameter associated with providing compensated samples for a set of multiple symbols associated with a slot. The operations of block 1210 may be performed in accordance with examples as disclosed herein. In some examples, aspects of the operations of 1210 may be performed by a skew time indication manager 825 as described with reference to FIG. 8.

At 1215, the method may include storing a set of samples associated with a first subset of the set of multiple symbols associated with the slot, the storing based on a processing delay associated with receiving DMRSs during a portion of the first subset of the set of multiple symbols associated with the slot. The operations of block 1215 may be performed in accordance with examples as disclosed herein. In some examples, aspects of the operations of 1215 may be performed by a storing manager 830 as described with reference to FIG. 8.

At 1220, the method may include transmitting, to the DU, a burst of compensated samples for the set of multiple symbols in a transmission window that is offset in time from a beginning symbol of the slot according to the skew time parameter. The operations of block 1220 may be performed in accordance with examples as disclosed herein. In some examples, aspects of the operations of 1220 may be performed by a sample distribution manager 835 as described with reference to FIG. 8.

FIG. 13 shows a flowchart illustrating a method 1300 that supports uplink symbols for DMRS on O-RAN in accordance with aspects of the present disclosure. The operations of the method 1300 may be implemented by a network entity or its components as described herein. For example, the operations of the method 1300 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1305, the method may include receiving, from a remote unit (RU), an indication of a skew time parameter associated with the RU providing compensated samples for a set of multiple symbols associated with a slot. The operations of block 1305 may be performed in accordance with examples as disclosed herein. In some examples, aspects of the operations of 1305 may be performed by a skew time indication manager 825 as described with reference to FIG. 8.

At 1310, the method may include receiving, from the RU, a burst of compensated samples for the set of multiple symbols in a transmission window that is offset in time from a beginning symbol of the slot according to the skew time parameter, where the burst of compensated samples are based on a set of samples associated with a first subset of the set of multiple symbols, the set of samples based on a processing delay associated with DMRSs during a portion of the first subset of the set of multiple symbols. The operations of block 1310 may be performed in accordance with examples as disclosed herein. In some examples, aspects of the operations of 1310 may be performed by a sample distribution manager 835 as described with reference to FIG. 8.

FIG. 14 shows a flowchart illustrating a method 1400 that supports uplink symbols for DMRS on O-RAN in accordance with aspects of the present disclosure. The operations of the method 1400 may be implemented by a network entity or its components as described herein. For example, the operations of the method 1400 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1405, the method may include receiving a capability message from the RU identifying a set of supported skew time parameters, where the skew time parameter is selected based on the capability message. The operations of block 1405 may be performed in accordance with examples as disclosed herein. In some examples, aspects of the operations of 1405 may be performed by a capability manager 850 as described with reference to FIG. 8.

At 1410, the method may include receiving, from a remote unit (RU), an indication of a skew time parameter associated with the RU providing compensated samples for a set of multiple symbols associated with a slot. The operations of block 1410 may be performed in accordance with examples as disclosed herein. In some examples, aspects of the operations of 1410 may be performed by a skew time indication manager 825 as described with reference to FIG. 8.

At 1415, the method may include receiving, from the RU, a burst of compensated samples for the set of multiple symbols in a transmission window that is offset in time from a beginning symbol of the slot according to the skew time parameter, where the burst of compensated samples are based on a set of samples associated with a first subset of the set of multiple symbols, the set of samples based on a processing delay associated with DMRSs during a portion of the first subset of the set of multiple symbols. The operations of block 1415 may be performed in accordance with examples as disclosed herein. In some examples, aspects of the operations of 1415 may be performed by a sample distribution manager 835 as described with reference to FIG. 8.

The following provides an overview of aspects of the present disclosure:

Aspect 1: A method for wireless communications at a RU, comprising: transmitting, to a DU, an indication of a skew time parameter associated with providing compensated samples for a plurality of symbols associated with a slot; storing a set of samples associated with a first subset of the plurality of symbols associated with the slot, the storing based on a processing delay associated with receiving DMRSs during a portion of the first subset of the plurality of symbols associated with the slot; and transmitting, to the DU, a burst of compensated samples for the plurality of symbols in a transmission window that is offset in time from a beginning symbol of the slot according to the skew time parameter.

Aspect 2: The method of aspect 1, further comprising: resetting the skew time parameter at a slot boundary occurring after a last symbol of the slot.

Aspect 3: The method of any of aspects 1 through 2, further comprising: setting the skew time parameter based at least in part on an available bandwidth for a fronthaul interface between the RU and the DU.

Aspect 4: The method of aspect 3, further comprising: setting the skew time parameter to a zero-value based on a failure of the available bandwidth for the fronthaul interface to satisfy a defined threshold.

Aspect 5: The method of any of aspects 1 through 4, further comprising: transmitting a capability message to the DU identifying a set of supported skew time parameters, wherein the skew time parameter is selected based on the capability message.

Aspect 6: The method of any of aspects 1 through 5, further comprising: receiving the DMRSs during the first subset of the plurality of symbols; and compensating each sample in the set of samples according to the DMRSs to obtain the burst of compensated samples.

Aspect 7: The method of any of aspects 1 through 6, further comprising: computing a plurality of beam weights corresponding to a respective plurality of receive beams at the RU; and compensating the set of samples by equalizing the set of samples according to the plurality of beam weights.

Aspect 8: The method of any of aspects 1 through 7, wherein the plurality of symbols associated with the slot comprise all symbols of the slot.

Aspect 9: The method of any of aspects 1 through 8, further comprising: receiving skew time capability information from the DU, wherein the skew time parameter is selected based on the skew time capability information.

Aspect 10: A method for wireless communications at a DU, comprising: receiving, from a RU, an indication of a skew time parameter associated with the RU providing compensated samples for a plurality of symbols associated with a slot; and receiving, from the RU, a burst of compensated samples for the plurality of symbols in a transmission window that is offset in time from a beginning symbol of the slot according to the skew time parameter, wherein the burst of compensated samples are based on a set of samples associated with a first subset of the plurality of symbols, the set of samples based on a processing delay associated with DMRSs during a portion of the first subset of the plurality of symbols.

Aspect 11: The method of aspect 10, further comprising: resetting the skew time parameter at a slot boundary occurring after a last symbol of the slot.

Aspect 12: The method of any of aspects 10 through 11, further comprising: setting the skew time parameter based at least in part on an available bandwidth for a fronthaul interface between the RU and the DU.

Aspect 13: The method of aspect 12, further comprising: setting the skew time parameter to a zero-value based on a failure of the available bandwidth for the fronthaul interface failing to satisfy a defined threshold.

Aspect 14: The method of any of aspects 10 through 13, further comprising: receiving a capability message from the RU identifying a set of supported skew time parameters, wherein the skew time parameter is selected based on the capability message.

Aspect 15: The method of any of aspects 10 through 14, wherein the plurality of symbols associated with the slot comprise all symbols of the slot.

Aspect 16: The method of any of aspects 10 through 15, further comprising: transmitting skew time capability information to the RU, wherein the skew time parameter is selected based on the skew time capability information.

Aspect 17: A RU for wireless communications, comprising one or more memories storing processor-executable code, and one or more processors coupled with the one or more memories and individually or collectively operable to execute the code to cause the RU to perform a method of any of aspects 1 through 9.

Aspect 18: A RU for wireless communications, comprising at least one means for performing a method of any of aspects 1 through 9.

Aspect 19: A non-transitory computer-readable medium storing code for wireless communications, the code comprising instructions executable by a processor to perform a method of any of aspects 1 through 9.

Aspect 20: A DU for wireless communications, comprising one or more memories storing processor-executable code, and one or more processors coupled with the one or more memories and individually or collectively operable to execute the code to cause the DU to perform a method of any of aspects 10 through 16.

Aspect 21: A DU for wireless communications, comprising at least one means for performing a method of any of aspects 10 through 16.

Aspect 22: A non-transitory computer-readable medium storing code for wireless communications, the code comprising instructions executable by a processor to perform a method of any of aspects 10 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A remote unit (RU), comprising:
one or more memories storing processor-executable code; and
one or more processors coupled with the one or more memories and individually or collectively operable to execute the code to cause the remote unit (RU) to:
transmit, to a distributed unit (DU), an indication of a skew time parameter associated with providing compensated samples for a plurality of symbols associated with a slot;
store a set of samples associated with a first subset of the plurality of symbols associated with the slot, the storing based on a processing delay associated with receiving demodulation reference signals during a portion of the first subset of the plurality of symbols associated with the slot; and
transmit, to the DU, a burst of compensated samples for the plurality of symbols in a transmission window that is offset in time from a beginning symbol of the slot according to the skew time parameter.

2. The remote unit (RU) of claim 1, wherein the one or more processors are individually or collectively further operable to execute the code to cause the remote unit (RU) to:
reset the skew time parameter at a slot boundary occurring after a last symbol of the slot.

3. The remote unit (RU) of claim 1, wherein the one or more processors are individually or collectively further operable to execute the code to cause the remote unit (RU) to:
set the skew time parameter based at least in part on an available bandwidth for a fronthaul interface between the RU and the DU.

4. The remote unit (RU) of claim 3, wherein the one or more processors are individually or collectively further operable to execute the code to cause the remote unit (RU) to:
set the skew time parameter to a zero-value based on a failure of the available bandwidth for the fronthaul interface to satisfy a defined threshold.

5. The remote unit (RU) of claim 1, wherein the one or more processors are individually or collectively further operable to execute the code to cause the remote unit (RU) to:
transmit a capability message to the DU identifying a set of supported skew time parameters, wherein the skew time parameter is selected based on the capability message.

6. The remote unit (RU) of claim 1, wherein the one or more processors are individually or collectively further operable to execute the code to cause the remote unit (RU) to:
receive the demodulation reference signals during the first subset of the plurality of symbols; and
compensate each sample in the set of samples according to the demodulation reference signals to obtain the burst of compensated samples.

7. The remote unit (RU) of claim 1, wherein the one or more processors are individually or collectively further operable to execute the code to cause the remote unit (RU) to:
compute a plurality of beam weights corresponding to a respective plurality of receive beams at the RU; and
compensate the set of samples by equalizing the set of samples according to the plurality of beam weights.

8. The remote unit (RU) of claim 1, wherein the plurality of symbols associated with the slot comprise all symbols of the slot.

9. The remote unit (RU) of claim 1, wherein the one or more processors are individually or collectively further operable to execute the code to cause the remote unit (RU) to:
receive skew time capability information from the DU, wherein the skew time parameter is selected based on the skew time capability information.

10. A distributed unit (DU), comprising:
one or more memories storing processor-executable code; and
one or more processors coupled with the one or more memories and individually or collectively operable to execute the code to cause the distributed unit (DU) to:
receive, from a remote unit (RU), an indication of a skew time parameter associated with the RU providing compensated samples for a plurality of symbols associated with a slot; and
receive, from the RU, a burst of compensated samples for the plurality of symbols in a transmission window that is offset in time from a beginning symbol of the slot according to the skew time parameter, wherein the burst of compensated samples are based on a set of samples associated with a first subset of the plurality of symbols, the set of samples based on a processing delay associated with demodulation reference signals during a portion of the first subset of the plurality of symbols.

11. The distributed unit (DU) of claim 10, wherein the one or more processors are individually or collectively further operable to execute the code to cause the distributed unit (DU) to:
reset the skew time parameter at a slot boundary occurring after a last symbol of the slot.

12. The distributed unit (DU) of claim 10, wherein the one or more processors are individually or collectively further operable to execute the code to cause the distributed unit (DU) to:

set the skew time parameter based at least in part on an available bandwidth for a fronthaul interface between the RU and the DU.

13. The distributed unit (DU) of claim 12, wherein the one or more processors are individually or collectively further operable to execute the code to cause the distributed unit (DU) to:

set the skew time parameter to a zero-value based on a failure of the available bandwidth for the fronthaul interface failing to satisfy a defined threshold.

14. The distributed unit (DU) of claim 10, wherein the one or more processors are individually or collectively further operable to execute the code to cause the distributed unit (DU) to:

receive a capability message from the RU identifying a set of supported skew time parameters, wherein the skew time parameter is selected based on the capability message.

15. The distributed unit (DU) of claim 10, wherein the plurality of symbols associated with the slot comprise all symbols of the slot.

16. The distributed unit (DU) of claim 10, wherein the one or more processors are individually or collectively further operable to execute the code to cause the distributed unit (DU) to:

transmit skew time capability information to the RU, wherein the skew time parameter is selected based on the skew time capability information.

17. A method for wireless communications at a remote unit (RU), comprising:

transmitting, to a distributed unit (DU), an indication of a skew time parameter associated with providing compensated samples for a plurality of symbols associated with a slot;

storing a set of samples associated with a first subset of the plurality of symbols associated with the slot, the storing based on a processing delay associated with receiving demodulation reference signals during a portion of the first subset of the plurality of symbols associated with the slot; and transmitting, to the DU, a burst of compensated samples for the plurality of symbols in a transmission window that is offset in time from a beginning symbol of the slot according to the skew time parameter.

18. The method of claim 17, further comprising:

resetting the skew time parameter at a slot boundary occurring after a last symbol of the slot.

19. The method of claim 17, further comprising:

setting the skew time parameter based at least in part on an available bandwidth for a fronthaul interface between the RU and the DU.

20. The method of claim 19, further comprising:

setting the skew time parameter to a zero-value based on a failure of the available bandwidth for the fronthaul interface to satisfy a defined threshold.

21. The method of claim 17, further comprising:

transmitting a capability message to the DU identifying a set of supported skew time parameters, wherein the skew time parameter is selected based on the capability message.

22. The method of claim 17, further comprising:

receiving the demodulation reference signals during the first subset of the plurality of symbols; and compensating each sample in the set of samples according to the demodulation reference signals to obtain the burst of compensated samples.

23. The method of claim 17, further comprising:

computing a plurality of beam weights corresponding to a respective plurality of receive beams at the RU; and compensating the set of samples by equalizing the set of samples according to the plurality of beam weights.

24. The method of claim 17, wherein the plurality of symbols associated with the slot comprise all symbols of the slot.

25. The method of claim 17, further comprising:

receiving skew time capability information from the DU, wherein the skew time parameter is selected based on the skew time capability information.

26. A method for wireless communications at a distributed unit (DU), comprising:

receiving, from a remote unit (RU), an indication of a skew time parameter associated with the RU providing compensated samples for a plurality of symbols associated with a slot; and receiving, from the RU, a burst of compensated samples for the plurality of symbols in a transmission window that is offset in time from a beginning symbol of the slot according to the skew time parameter, wherein the burst of compensated samples are based on a set of samples associated with a first subset of the plurality of symbols, the set of samples based on a processing delay associated with demodulation reference signals during a portion of the first subset of the plurality of symbols.

27. The method of claim 26, further comprising:

resetting the skew time parameter at a slot boundary occurring after a last symbol of the slot.

28. The method of claim 26, further comprising:

setting the skew time parameter based at least in part on an available bandwidth for a fronthaul interface between the RU and the DU.

29. The method of claim 28, further comprising:

setting the skew time parameter to a zero-value based on a failure of the available bandwidth for the fronthaul interface failing to satisfy a defined threshold.

30. The method of claim 26, further comprising:

receiving a capability message from the RU identifying a set of supported skew time parameters, wherein the skew time parameter is selected based on the capability message.

* * * * *